US012187322B1

(12) United States Patent
Olson et al.

(10) Patent No.: US 12,187,322 B1
(45) Date of Patent: Jan. 7, 2025

(54) SEVERITY SIMULATION FOR AUTONOMOUS VEHICLES

(71) Applicant: Zoox, Inc., Foster City, CA (US)

(72) Inventors: Sy Kelly Olson, Oakland, CA (US); Julia A. Wyatt, Sudbury, MA (US)

(73) Assignee: Zoox, Inc., Foster City, CA (US)

( * ) Notice: Subject to any disclaimer, the term of this patent is extended or adjusted under 35 U.S.C. 154(b) by 118 days.

(21) Appl. No.: 17/555,208

(22) Filed: Dec. 17, 2021

(51) Int. Cl.
*B60W 60/00* (2020.01)
*B60W 30/09* (2012.01)
*G05B 17/02* (2006.01)

(52) U.S. Cl.
CPC ........ *B60W 60/0027* (2020.02); *B60W 30/09* (2013.01); *G05B 17/02* (2013.01); *B60W 2554/404* (2020.02); *B60W 2556/10* (2020.02)

(58) Field of Classification Search
None
See application file for complete search history.

(56) References Cited

U.S. PATENT DOCUMENTS

| 6,195,625 | B1 * | 2/2001 | Day | G06T 19/20 |
| | | | | 703/7 |
| 2022/0185302 | A1 * | 6/2022 | Dev | B60W 50/06 |
| 2022/0203916 | A1 * | 6/2022 | Lee | B60R 21/16 |
| 2023/0131632 | A1 * | 4/2023 | Hartnett | G06F 30/20 |
| | | | | 703/8 |

OTHER PUBLICATIONS

Rose, Nathan A., Stephen J. Fenton, and Christopher M. Hughes. "Integrating Monte Carlo simulation, momentum-based impact modeling, and restitution data to analyze crash severity." SAE transactions (2001): 2562-2576. (Year: 2001).*
https://stackoverflow.com/questions/30379393/average-results-from-multiple-simulations (Year: 2018).*
"Predicting Crash Injury Severity with Machine Learning Algorithm Synergized with Clustering Technique: A Promising Protocol" (Jul. 30, 2020) (Year: 2020).*

* cited by examiner

*Primary Examiner* — James J Lee
*Assistant Examiner* — David Hatch
(74) *Attorney, Agent, or Firm* — Lee & Hayes, P.C.

(57) ABSTRACT

Techniques for determining a safety metric associated with a vehicle controller are discussed herein. The safety metric may be reflective of one or more severity scores associated with a collision simulated by simulating performance of the vehicle controller. The techniques may include determining a simulation scenario, simulating the scenario by simulating a component of an autonomous vehicle, and determining simulation data describing a collision occurring between the simulated autonomous vehicle and an object in the scenario. The simulation data is used to determine a severity score for the collision that may be used to refine the component of the autonomous vehicle system and/or validate the component for safe operation.

20 Claims, 7 Drawing Sheets

SEVERITY SIMULATION FOR AUTONOMOUS VEHICLES

BACKGROUND

An autonomous vehicle can use an autonomous vehicle controller to guide the autonomous vehicle through an environment. For example, the autonomous vehicle controller can use planning methods, apparatuses, and systems to determine a drive path and guide the autonomous vehicle through the environment that contains dynamic objects (e.g., vehicles, pedestrians, animals, and the like) and static objects (e.g., buildings, signage, stalled vehicles, and the like). However, in order to ensure safety of the occupants, it's important to validate the safety of the autonomous vehicle controller.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
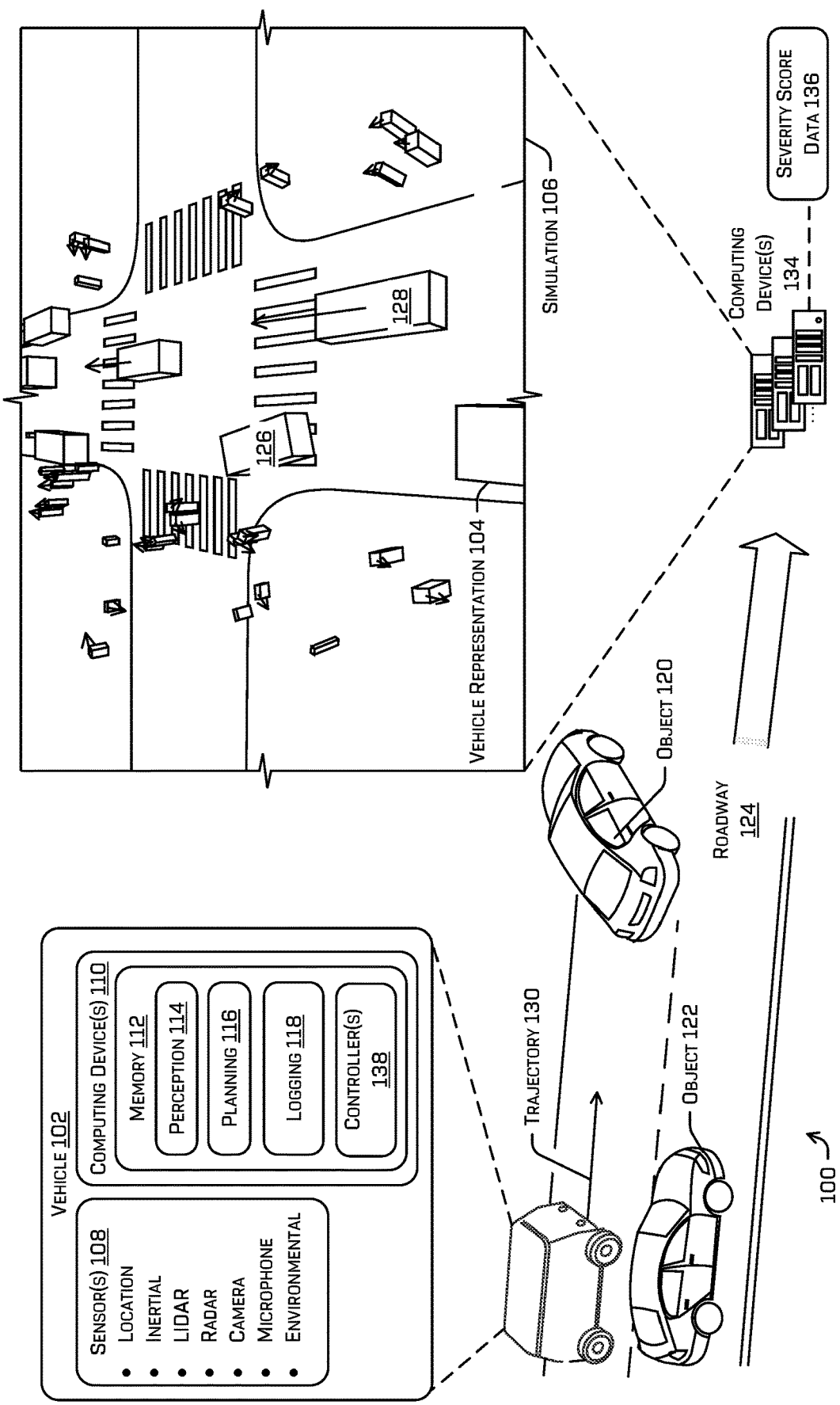
FIG. 1 illustrates an example scenario including an autonomous vehicle operating that may be modeled in a simulated scenario to simulate severity of collisions.

Techniques described herein relate to determining more accurate assessments of severity of collisions in simulations. For example, techniques described herein may take into account multiple characteristics of a simulated collision between a vehicle and an object (e.g., another vehicle, a pedestrian, a static object, etc.) in the simulated environment in order to determine a severity score associated with the collision. The severity score may represent a probability of injury or fatality of an occupant of the vehicle and/or a person associated with the object.

By computing more accurate assessments of severity of collisions, control systems of autonomous vehicles can be adapted and improved to decrease a risk of occupant injury during a collision event. In at least some examples described herein, severity scores may be determined, for example, using simulations in conjunction with other performance metric determinations. Simulations can be used to validate software (e.g., a vehicle controller) executed on vehicles (e.g., autonomous vehicles) and gather safety metrics to ensure that the software is able to safely control such vehicles before being used in a real-world environment. In additional or alternative examples, simulations can be used to learn about constraints of autonomous vehicles that use the autonomous controller. For instance, simulations can be used to understand the operational space of an autonomous vehicle (e.g., an envelope in which the autonomous controller effectively controls the autonomous vehicle) taking into account environmental conditions, surface conditions, ambient noise, component failures, safety protocols, etc. Simulations can also be useful for generating feedback for improving operations and designs of autonomous vehicles. For instance, in some examples, simulations can be useful for determining an amount of redundancy that is required in an autonomous controller, or how to modify a behavior of the autonomous controller based on what is learned through simulations. Furthermore, in additional or alternative examples, simulations can be useful to inform the hardware design of autonomous vehicles, such as optimizing placement of sensors on an autonomous vehicle, determining minimum performance characteristics of components (e.g., sensors, motors, controllers, etc.) to meet operational requirements, etc.

When creating a simulation environment to perform testing and validation of various systems, it is possible to enumerate the environment with various and specific examples. Each variation of such an environment can be unique and defined. In some examples, the simulations may be used to evaluate performance of the autonomous vehicle in one or more different collision scenarios. The various collision scenarios may reflect collisions between the autonomous vehicle and one or more objects in an environment in different configurations (e.g., head on collision, collision with a stationary object, side collision, collision of vehicle with larger vehicle, vehicle with similar sized vehicle, collision of vehicle with pedestrian, etc.). Different collision scenarios, such as enumerated above, involve different collision kinematics that will affect the outcomes of the simulated collisions and should accurately reflect a real-world environment as much as possible to provide accurate representation of the performance of the autonomous vehicle in such situations. Simplifications may enable simulations to be performed more quickly, which enables evaluation of control and safety systems more quickly.

For example, a vehicle or multiple vehicles can traverse an environment and generate simulation data associated with the environment and interactions, such as collisions with objects in the environment. The collision data may be compared against metrics or standards to ensure adherence to or performance in excess of safety standards and thresholds before control systems or updates are implemented in real-world applications. The simulation data can include simulated miles or distances traveled by autonomous vehicles before a collision that may be compared against real-world data for benchmarks. The simulation data can also include collision data describing the type of collision (head-on, glancing, moving versus stationary object, etc.), as well as the mass and/or momentum of the vehicles and/or objects involved in the collision. The simulation data may be used to determine a severity for each collision to determine how severe the collision is and the probability of injury or fatality as a result of such a collision. The simulation data may be processed using one or more algorithms that account for vehicle and/or object size, mass, velocity, momentum, and configuration, as well as for collision types including collision directions, plane of collision (defined as perpendicular to the direction of travel during the collision, and/or coefficient of restitution for the collision based on the conservation of momentum within the system of the collision. In some examples, the simulation data can include simplifications, such as approximating the mass of vehicles or object on the size of a bounding box containing the vehicle or object, with the mass increasing based on a scaling factor with the dimensions of the bounding box. Such simplifications may enable simulations of the environment and the collisions within the environment in less time and using less computational resources than a more detailed physics-based simulation of the environment and collisions. The simulation data, including the data regarding the collision, may be used to determine a severity score for the autonomous vehicle and the other vehicles and/or objects indicative of a probability of injury or fatality of an individual associated with a vehicle or location within the environment (e.g., riding in or on a vehicle or present within an environment at the location of a collision).

The severity score may be used as a metric to evaluate the performance of the control system at avoiding server collisions. The severity score may be used to determine one or more other measures of performance of the control system, such as time or distance traveled by the autonomous vehicle before a collision of a particular severity occurs, which may be compared against benchmark data (e.g., real-world data of human driver distances traveled (and/or reaction times, etc.) before a fatal collision or before a collision resulting in injury of a particular severity level). Based at least in part on the severity score and/or other measures of performance, the control system of the autonomous vehicle may be adapted to adjust an operating envelope, safety parameters (e.g., max speeds, minimum turning radius at varying velocities, minimum following distances, etc.), stopping distances, responsive maneuvers, components and subcomponents (e.g., brake pads, suspension systems, perception systems, etc.) and other such factors to further improve the performance of the autonomous vehicle control system. In some examples, the severity score may be mapped or correspond with a maximum abbreviated injury scale (MAIS) or other classification system to evaluate the relative and/or absolute severity of the collision and resultant severity or likelihood of different injury classes to individuals. The severity score may additionally or alternatively be correlated with a momentum change for a particular individual or energy involved in a particular collision to determine the severity of and/or probability of injury as a result of the collision. The MAIS score may classify a serious traffic injury on a scale of one to five with injuries having a score greater than or equal to three indicative of a serious traffic collision injury.

A computer system, that may be associated with one or more autonomous vehicles and/or a fleet of vehicles may perform the simulations described above and may determine the severity scores for various collisions and compare those scores against benchmarks and standards to ensure the autonomous vehicle control system meets or exceeds the benchmarks. The computing device can, based on the simulation data, determine various scenarios (collisions of various types), a frequency of the various scenarios (e.g., a time or distance traveled before a collision of a particular type), and regions of the environment that are associated with the various scenarios (e.g., locations where collisions are more likely to occur or occur more frequently). In some examples, one or more simulations may be performed for testing safety parameters of a vehicle. An example of such simulations is described in U.S. patent application Ser. No. 17/207,451, filed Mar. 19, 2021, the entirety of which is incorporated herein for all purposes. In some instances, the computing device can group similar scenarios represented in the simulation data (e.g., using various clustering algorithms and based on a description of the scenario—number of agents, speeds, environmental conditions, etc.). The similar events can be grouped together and may be compiled and used to determine averages and other statistically meaningful data describing the severity scores for collisions and distances traveled before collisions having certain severity scores are encountered.

In some instances, the simulation can be used to test and validate a response of the autonomous vehicle controller to a potential collision or other scenario encountered in the environment. In such an example, the computing device can be configured to introduce behavior consistent with real-world behavior or actions by other objects (e.g., pedestrians, bikes, motorcycles, etc.) and vehicles that may be based off of stored log data previously recorded by a fleet of autonomous vehicles or based on synthetic data programmed for the simulation.

Simulating the autonomous vehicle in an environment based on real-world data and determining severity scores for resulting collisions provides a manner for evaluating safety and performance of the control system for the vehicle with respect to the safety and protection of passengers. For example, the simulation data can indicate a severity score and distance traveled before a collision of a particular severity score occurs that may be compared against a benchmark for use in improving performance of the safety system of the autonomous vehicle before implementation in a real-world environment.

Techniques described herein offer various computational efficiencies. For instance, by using the techniques described herein, computing devices require fewer computational resources and a plurality of simulated scenarios can be generated faster than what is available via conventional techniques using physics-based modeling and simulation techniques that are typically used to model vehicle collisions. Techniques described herein-such as modeling a variety of different collision types based on simple kinematics and using vehicle momentum and coefficient of restitution of the resulting collision results in simulations that may be processed with greater computational efficiency that results in reduced time for improvement cycles of the control system of the autonomous vehicle than what is available with conventional techniques.

Furthermore, techniques described herein are directed to improvements in safety. That is, simulated environments resulting from generation techniques described herein can be used for testing, training, and validating systems onboard an autonomous vehicle to ensure such systems can operate autonomous vehicles safely when deployed in real environments. That is, simulated environments resulting from generation techniques described herein can be used for testing, training, and validating a planner system and/or a prediction system of an autonomous vehicle controller, which can be used by an autonomous vehicle to navigate the autonomous vehicle along a trajectory in a real environment. Thus, such training, testing, and validating enabled by techniques described herein can provide opportunities to ensure that autonomous vehicles can operate in real world environments safely. As such, techniques described herein improve safety and impact navigation.

FIG. 1 illustrates an example scenario 100 including a vehicle(s) 102 and a simulation 106 of the example scenario 100. In some examples, the example scenario 100 may be a real-world scenario and/or the example scenario 100 may be a representation of a real-world scenario modeled as a simulated scenario. The example scenario 100 may be simulated at a computing device(s) 134 where a safety simulation may be implemented according to the present description. The computing device(s) 134 may be an example of a computing device and may include one or more computing devices communicably coupled together. In examples where the example scenario 100 is a simulated scenario, the example scenario 100 may be determined based at least in part on a set of scenario parameters identifying characteristic(s) of the simulation, input received at a user interface of a computing device (e.g., a user of the computing device may define the environment, objects therein, and/or characteristics thereof), and/or the example scenario 100 may be based at least in part on log data received from one or more autonomous vehicles. The log data may be based at least in part on sensor data received at an autonomous vehicle and/or a fleet of vehicles, perception data generated by a perception component, and/or instructions generated by a planning component. In this manner, the simulation 106 may reflect real-world conditions during the simulation 106. In some examples, the simulation 106 may be entirely determined based on experimental parameters or user-defined parameters.

The simulation 106 illustrates the interactions and navigation of a vehicle(s) 102 through and environment. The simulation 106 may be generated using a control system of a vehicle(s) 102 such that actions performed in the simulation 106 reflect actions that the vehicle(s) 102 would perform while operating in a real-world environment. In some instances, the vehicle(s) 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle(s) 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle(s) 102 is depicted as a land vehicle, vehicle(s) 102 may be a spacecraft, watercraft, and/or the like. In some examples, vehicle(s) 102 may be represented in a simulation as a simulated vehicle, such as the vehicle representation 104 in simulation 106. For simplicity, the discussion herein does not distinguish between a simulated vehicle and a real-world vehicle. References to a "vehicle" may therefore reference a simulated and/or a real-world vehicle.

Within the simulation 106, the vehicle representation 104 may model the behavior of the vehicle(s) 102. Accordingly, actions that may be performed by the vehicle(s) 102 are modeled and simulated by the vehicle representation 104. The vehicle representation 104 travels through the environment of simulation 106 based on simulation-defined parameters that may include simulations based on log data from one or more vehicle(s) 102, user-defined data, system-defined data, or otherwise established simulation parameters. The performance of the vehicle representation 104 within the simulation 106 may reflect the behavior of the vehicle(s) 102 and may be based on using a vehicle controller system for a vehicle(s) 102 in the simulation 106 to validate, verify, and/or test the control components of the vehicle in different situations.

For example, in the example scenario 100, the object 120 is turning left ahead of the vehicle(s) 102 while object 122 is in an adjacent lane to the vehicle(s) 102. The object 120 may slow and turn and may be affected by one or more other components within the environment, such as pedestrians. Turning to the simulation 106, the vehicle representation 104 travels in the direction of the trajectory 130 with object representation 126 turning left while object representation 128 is positioned in a lane adjacent the vehicle representation 104. The representations are shown as bounding boxes as described herein to simplify computations required to run the simulation 106. As the object 120 or object representation 126 turns, it may have to stop based on the presence of one or more objects in the path of the turn (e.g., crosswalk) while vehicle representation 104 approaches along trajectory 130. Such an example scenario 100 may be used to verify the performance of the vehicle(s) 102 to ensure the vehicle begins to apply a brake and slows and/or stops before reaching the object 120. Additional scenarios may be simulated to verify performance of the vehicle(s) 102. In some examples a collision may be detected between the vehicle representation 104 and the object representation 126. The collision may be a result of a failure of one or more components of the vehicle(s) 102 to prepare for and respond to the example scenario 100.

The resulting collision between the vehicle representation 104 and the object representation 126 may be analyzed to determine a severity of the collision and one or more probabilities associated with the collision including a probability of injury or fatality as a result of the collision. The severity of the collision may be scaled, based on the probability of injury and/or fatality to a severity score. In an example, the severity of the collision may be scaled by a scalar, such that the severity may be adjusted based on relative probabilities of fatality and/or injuries, with collisions resulting in higher probabilities of injuries and/or fatalities receiving higher severity scores. In some examples, the severity score may be scaled based on a relatively higher probability of fatality alone such that two different simulated collisions with similar or identical probabilities of injuries but different probabilities of fatality receive different severity scores, with the simulated collision associated with a higher probability of fatality receiving a higher severity score. The severity score may be stored as severity score data 136 at the computing device(s) 134 and include data regarding the simulation, conditions, probability of injury and/or fatality, and other corresponding data.

The severity score, which may correspond to the probability of injury and/or fatality, is based on one or more functions describing the probability of injury and/or a probability of injury of a particular type. For example, the underlying functions, shown in FIG. 5, may reflect a probability of fatality for different collision types. The collision types may include information such as the direction of the collision (frontal crash, side impact, glancing impact, etc.) as well as the relative velocity between the objects at the time of the collision. In some examples, different functions may be determined based on collision types relating to vehicle and object sizes (e.g., vehicle versus similarly sized vehicle, vehicle versus pedestrian sized object, vehicle versus larger vehicle, etc.). A collection of functions may be defined and used to determine a probability of injury and/or fatality. In some examples the functions may define a probability of fatality as a function of velocity difference between the objects. A probability of injury may be determined based on a multiplier of the probability of fatality, for example by using a multiplier of one hundred times the probability of fatality to determine a probability of injury. In some examples functions may be defined using experiential data, such as from a vehicle collision database. In some examples, the functions may include functions for different ratings or classes of injuries, for example with different functions for each of the different classes of injuries used in the MAIS scoring system and each function describing a probability of an injury having a particular MAIS score. In various examples, a seating position of an occupant may be used in computing the score. In such examples, a symmetry of the vehicle may further reduce computational complexity when determining the score (e.g., a carriage-style seating vehicle may only need to define a function for one or two occupants based on the symmetry).

The severity score data 136 may also be based on collision data that includes the momentum involved in the collision, energy present within the environment of the collision (total energy and/or energy exchanged or transferred), coefficient of restitution, which may be determined based on the conservation of momentum within the environment, and other such factors. The coefficient of restitution may be calculated using the masses of the objects involved in the collision as determined based on the bounding boxes of each described above. The coefficient of restitution may be determined using the equations below that use the changes in velocity of each object ($v_1$ reflecting the initial velocity of object 1 while $u_1$ reflects the final velocity of object 1), difference in velocity of the objects before the collision, and mass of each object to determine the coefficient of restitution (e):

$$v_1 - u_1 = \frac{(1+e)m_2}{m_1 + m_2}\Delta v$$

$$v_2 - u_2 = \frac{(1+e)m_2}{m_1 + m_2}\Delta v$$

The coefficient of restitution (e) represents the amount of energy conserved during the collision. The amount of energy conserved in the collision may be used as an input to determine a probability of fatality and/or injury. Vehicle collisions tend to be inelastic, with energy dissipated in deformation of vehicle components rather than energy returned as kinetic energy following the collision (that may be more likely to result in injury and/or fatality to a passenger.

The severity score data 136 may be used to evaluate the performance of the vehicle(s) 102 using the simulation 106 and test components or updates to components before rolling out in a fleet of vehicle(s) 102. The components and/or algorithms controlling the vehicle(s) 102 may be adjusted based on the severity score data 136 in some examples. The severity score data 136 may include data corresponding to a distance travelled before a collision occurs, or distance travelled before a collision of a particular severity occurs. The severity score data 136, including the distance travelled before a collision, may be compared against a benchmark for safety to verify performance of the safety systems of the vehicle(s) 102. In some examples the benchmark may be based on a human driver and may reflect average distances travelled by human drivers before a collision of a particular type. The vehicle(s) 102 may be expected to perform at or above the performance of the human drive, for example incur a fraction (e.g., a tenth, a fifth, a half, etc.) of the number of injury and fatality rates given a particular scenario as compared to a human (which may be mathematically equivalent to, for example, exceeding a total distance travelled before a collision relative to a human driver by a factor, such as a factor of five). Additional benchmarks and standards may be based on established industry, government, and company standards. In at least some examples, such performances may include the number of collisions in the aggregate, regardless of the level of severity. In any of the examples enumerated above, if the controller doesn't meet or exceed such a performance data threshold (e.g., driving ten times better than a human), the controller will not be put on the vehicle and additional tests may be performed (controller changes, causes for driving behavior inspected, etc.). Alternatively, such processes may validate the controller for placement on the vehicle.

In some examples, a machine learned model may identify one or more safety parameters and/or maneuvers associated with the vehicle and may compare simulation data against the safety parameters and/or maneuvers to ensure that the simulated vehicle performs at or above the expected threshold of safety. For example representative scenarios may be simulated with the machine learned model configured to determine scores and values for different safety parameters to minimize probabilities of injury and/or fatality or a severity of a collision.

According to the techniques discussed herein, data gathered by the vehicle(s) 102 may include sensor data from sensor(s) 108 of the vehicle(s) 102. Such sensor data may be simulated within the simulation 106 to accurately model the behavior of the vehicle(s) 102 within the simulation 106. For example, the sensor(s) 108 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, a simulated sensor may correspond with at least one of the sensor(s) 108 on the vehicle(s) 102 and in a simulation, one or more of sensor(s) 108 may be simulated. In some examples, the position of a simulated sensor may correspond with a relative position of one of the sensor(s) 108 to the vehicle(s) 102 and/or vehicle representation 104.

The sensor(s) 108 may generate sensor data, which may be received by computing device(s) 110 associated with the vehicle(s) 102. However, in other examples, some or all of the sensor(s) 108 and/or computing device(s) 110 may be separate from and/or disposed remotely from the vehicle(s) 102 and data capture, processing, commands, and/or controls may be communicated to/from the vehicle(s) 102 by one or more remote computing devices via wired and/or wireless networks. During a simulation, the sensor data may be simulated based at least in part on a synthetic environment generated by the simulation system.

Computing device(s) 110 may comprise a memory 112 storing a perception component 114, a planning component 116, and/or a logging component 118. Note that, in some examples, the computing device(s) 110 may additionally or alternatively store a localization component, which may comprise software and/or hardware system(s) for determining a pose (e.g., position and/or orientation) of the vehicle(s) 102 relative to one or more coordinate frames (e.g., relative to the environment, relative to a roadway, relative to an inertial direction of movement associated with the autonomous vehicle). The localization component may output at least part of this data to the perception component 114, which may output at least some of the localization data and/or use the localization data as a reference for determining at least some of the perception data.

The perception component 114 may determine what is in the environment surrounding the vehicle(s) 102 (or during a simulation what is in the simulated environment) and the planning component 116 may determine how to operate the vehicle(s) 102 (or control the vehicle representation 104 in a simulation) according to information received from the localization component and/or the perception component 114. The localization component, the perception component 114, and/or the planning component 116 may include one or more machine-learned (ML) models and/or other computer-executable instructions.

In some examples, the localization component and/or the perception component 114 may receive sensor data from the sensor(s) 108 and/or simulated data from a simulation system. In some instances, the perception component 114 may determine data related to objects (or simulated objects) in the vicinity of the vehicle(s) 102 (e.g., classifications associated with detected objects, instance segmentation(s), tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. In some examples, the objects surrounding the vehicle(s) 102 may be simulated objects of a simulated environment. The data produced by the perception component 114 may be collectively referred to as "perception data." Once the perception component 114 has generated perception data, the perception component 114 may provide the perception data to the planning component 116.

In some examples, a simulation 106 simulations to validate a particular component of the vehicle(s) 102, such as a safety system, may provide simulation data directly to that component. For example, to test the planning component 116, instead of providing simulated sensor data to the perception component 114, simulated perception data may be provided to the planning component 116 directly. This simulated perception data may be ground truth data, in at least one example. Additionally or alternatively, the vehicle system(s) may be tested as a whole by providing simulated sensor data to the localization component and/or perception component (e.g., to the system(s) that would be root nodes/furthest upstream during normative operation rather than providing simulated data to an intermediate component in the vehicle system).

During a real-world scenario, perception component 114 may detect object 120, a vehicle in the depicted example; object 122, another vehicle in the example; and/or characteristics of the roadway 124. During a simulation, perception component 114 may detect object representation 126 and/or object representation 128, where object representation 126 may represent object 120 and object representation 128 may represent object 122 in a simulation that reproduces the real-world scenario illustrated. Note that the simulation 106 depicted is a simplified simulation where different objects are represented as boxes and the simulation 106 additionally includes additional simulated objects representing additional vehicles and pedestrians. It is understood that, instead of or in addition to a simplified simulation, the simulation may replicate real-world appearances. In the simulation 106, bounding boxes for objects within the environment may be used to simplify computational load and may also be used for determining one or more characteristics of the object. For example, a mass of an object may be determined based on the dimensions of the bounding box, with mass increasing as bounding box volume increases. In some examples the mass of the object may scale linearly, exponentially, quadratically, or based on any other relationship between object size and object mass that may be defined within the simulation 106.

When a perception component 114 detects an object, whether real or simulated, the perception component 114 may generate an object detection, which may comprise a data structure indicating one or more characteristics of the object. For example, the object detection may indicate a region of interest (ROI) associated with the object detection (e.g., a bounding box, mask, or other indication of a portion of sensor data associated with the object); a volume or area occupied by the object; a pose (e.g., position and/or orientation), velocity, acceleration, classification (e.g., vehicle, pedestrian, articulating vehicle, signage), etc. associated with the object, etc. The perception component 114 may associate an object detection with a track, which may indicate that the object has been previously detected and may comprise historical perception data and/or predicted perception data associated with the object. For example, the track may associate one or more object detections associated with a same object but different times.

According to the techniques discussed herein, the logging component 118 may determine log data comprising sensor data, perception data, scenario data, planning data and/or any other message data generated by a component or sub-component of the vehicle to store and/or transmit to a remote computing device, such as computing device(s) 134, as well as any other message generated and or sent by the vehicle(s) 102 during operation including, but not limited to, control messages, error messages, etc. In some examples, a vehicle(s) 102 may transmit the log data to a remote computing device(s). The remote computing device(s) may identify one or more scenarios based at least in part on the log data, which may also comprise defining a scenario. For example, the remote computing device(s) may determine an environmental layout, a number, type, and a configuration of object(s) in the environment and/or associate this definition with one or more portions of log data associated with that scenario. Note that, although simulation scenarios may be determined from log data, they may also be defined based at least in part on user input, procedurally generated, or the like.

In some examples, the perception component 114 may comprise a prediction component that determines predicted data associated with an object, such as a predicted future position, orientation, velocity, acceleration, or the like. This predicted data and/or historical data associated with an object may be amalgamated as a track in association with the object. In some examples, the prediction data may be additionally or alternatively based at least in part on map data or other data. In some examples, the prediction data may comprise a top-down segmentation of the environment, as described in more detail in U.S. patent application Ser. No. 15/963,833, which is incorporated in its entirety herein, and/or a top-down prediction associated with the environment, as described in more detail in U.S. patent application Ser. No. 16/779,576, which is incorporated in its entirety herein.

The planning component 116 may determine a trajectory 130 based at least in part on the perception data and/or localization data (e.g., where the vehicle(s) 102 is in the environment relative to a map and/or features detected by the perception component 114). For example, the planning component 116 may determine a route for the vehicle(s) 102 from a first location to a second location; generate, substantially simultaneously and based at least in part on the perception data, a plurality of potential trajectories for controlling motion of the vehicle(s) 102 in accordance with a receding horizon technique (e.g., 1 micro-second, half a second) to control the vehicle to traverse the route (e.g., in order to avoid any of the detected objects); and select one of the potential trajectories as a trajectory 130 that the vehicle(s) 102 may use to generate a drive control signal that may be transmitted to drive components of the vehicle(s) 102 or, in a simulation, to control the vehicle representation 104 in the simulated environment.

FIG. 1 depicts an example of such a trajectory 130, represented as an arrow indicating a heading, velocity, and/or acceleration, although the trajectory itself may comprise instructions for a controller, which may, in turn, actuate a drive system of the vehicle(s) 102. For example, the trajectory 130 may comprise instructions for controller(s) 138 of the vehicle(s) 102 to actuate drive components of the vehicle(s) 102 to effectuate a steering angle and/or steering rate, which may result in a vehicle position, vehicle velocity, and/or vehicle acceleration (or a simulated version thereof when the autonomous vehicle is being simulated). The trajectory 130 may comprise a target heading, target steering angle, target steering rate, target position, target velocity, and/or target acceleration for the controller(s) 138 to track. However, in a simulation, the trajectory may be used by a simulation system to control a position, orientation, velocity, acceleration, etc. of the simulated autonomous vehicle.

Figure 2:
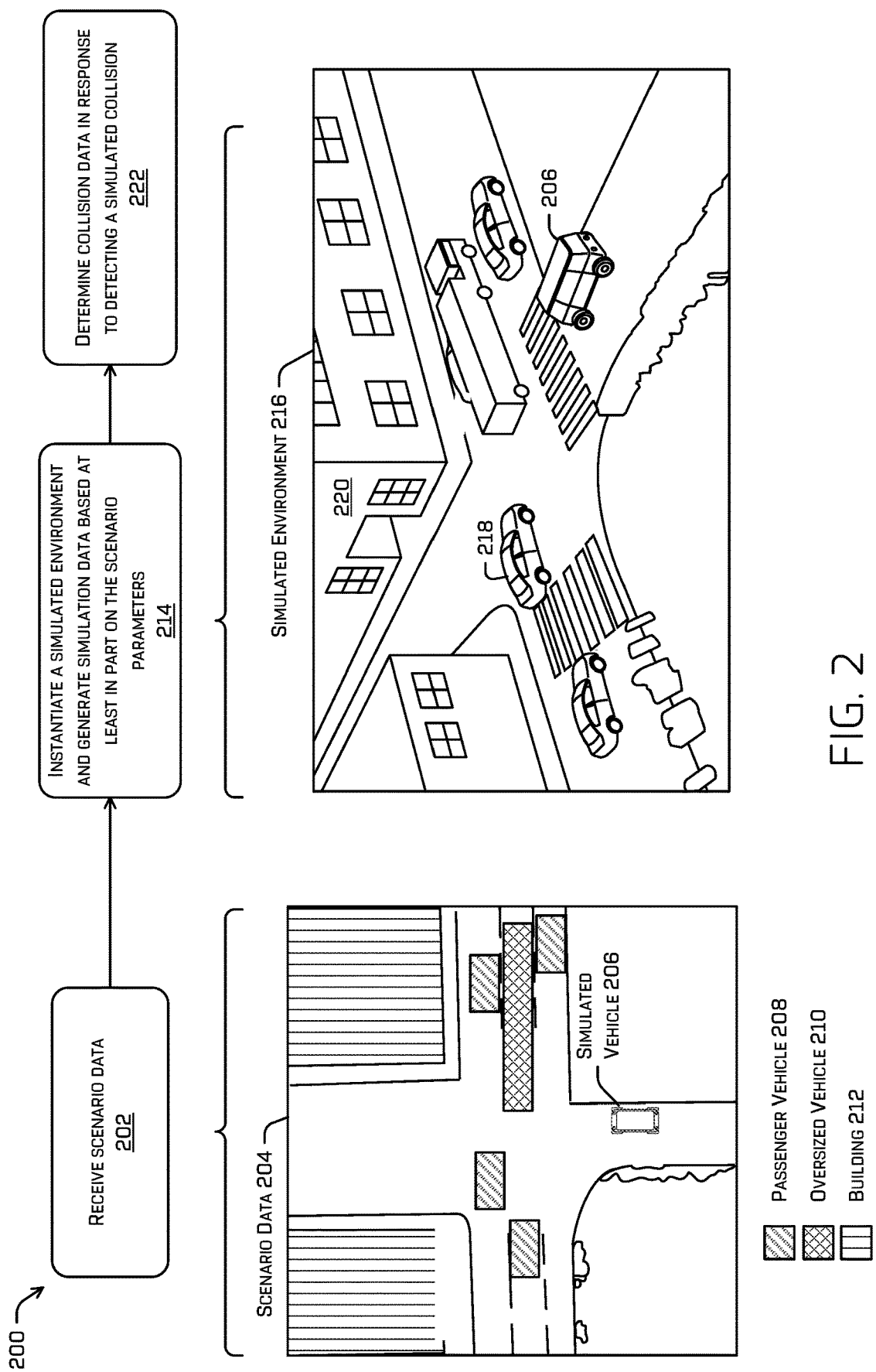
FIG. 2 illustrates a flow diagram of an example process for generating a scenario and testing operation of a component of an autonomous vehicle to accurately determine a severity score for autonomous vehicle collisions in an adverse event.

FIG. 2 illustrates a pictorial flow diagram of an example process 200 of an example process for using a simulation to verify performance of one or more systems of an autonomous vehicle. The example process 200 may be used to determine collision data, including one or more severity scores describing the collision within the simulated environment 216. In some examples, example process 200 may be executed by the computing device(s) 134 in a fully or partially synthetic scenario, where the scenario is fully generated based at least in part on scenario instructions or partially using sensor data, respectively. The synthetic scenario may be executed in real or synthetic time. For example, a partially synthetic scenario may generate the scenario data based at least in part on real-time sensor data or based on log data.

At operation 202, example process 200 may comprise receiving scenario data, according to any of the techniques discussed herein. The scenario data 204 may comprise the set of scenario parameters selected according to the techniques discussed herein. In an additional or alternate example, a simple simulation component may generate the scenario data 204 based at least in part on the set of scenario parameters. In some examples, the simple simulation component may determine a portion of a map or environment that fits minimum requirements specified by the set of scenario parameters, such as a number of controlled intersections, a number of roadways, the existence and/or placement of roadway or field of view obstructions, etc. In some examples, the scenario data 204 may comprise a position, orientation, and/or characteristics of the simulated vehicle 206 in the environment, which may correspond to real-time operation of a vehicle(s) 102 and/or may correspond to simulated operation of the autonomous vehicle. In some examples, a planning component of the autonomous vehicle may generate instructions for controlling the simulated vehicle 206 in an agnostic manner to the simulation (e.g., the instructions generated by the planning component may be the same as those generated for a similar real-world situation). In some examples, a component may translate instructions generated by the planning component to instructions for controlling the simulated vehicle 206 in the simulated environment (e.g., updating a simulated state associated with the simulated vehicle 206, which may comprise a position, orientation, velocity, acceleration, heading, and/or the like associated with the simulated vehicle 206).

The scenario data 204 may additionally or alternatively comprise an indication of an object type associated with one or more objects (e.g., passenger vehicle 208, oversized vehicle 210, building 212) and/or characteristics associated with the one or more objects (e.g., a position, velocity, acceleration, heading, material type, kinematic coefficient), as indicated by the selected set of scenario parameters. In some examples, the object type may include dimensions of a bounding box containing the object that may be used to determine the mass of the object as described above. The mass of the object may be used for determining momentum of the objects during a collision event as well as a coefficient of restitution that will affect the collision data and may impact the severity score associated with the collision. Note that the scenario data 204 is represented as a two-dimensional image, although, in additional or alternate examples, the scenario data 204 may comprise a data structure, such as a pub-sub message, and/or the like.

At operation 214, example process 200 may comprise instantiating, based at least in part on the scenario data, a simulated environment, according to any of the techniques discussed herein. Operation 214 may comprise procedurally generating the simulated environment 216 based at least in part on a set of template models associated with the object types. For example, the set of template models may comprise six different passenger vehicle models, eighteen different pedestrian models, two different types building models, and/or the like. Any number of different models may exist. In some examples, a template model may comprise a three-dimensional model of a surface of an object without any texturing, although in additional or alternate examples, the model may comprise texture. The template model may comprise a polygon mesh, a triangle mesh, and/or the like. In some examples, models associated with dynamic objects may have a higher polygon count than models associated with static objects. For example, vehicle 218 may comprise a polygon mesh having a first polygon count and building 220 may comprise a polygon mesh having a second polygon count, where the first polygon count is greater than the second polygon count.

In some examples, the simulated environment 216 may comprise surface models and lack lighting and/or textures. In additional or alternate examples, the simulated environment 216 may comprise lighting and/or textures, but the techniques described herein work without lighting and/or textures. The simulated environment 216 may comprise a model of the simulated vehicle 206. In some examples, instantiating the environment portion of the simulated environment may be based at least in part on map data and objects in the environment may be based at least in part on instructions received as part of the scenario data (e.g., instructions generated based at least in part on user selection(s) and/or interaction with a user interface, procedurally-generated instructions).

At operation 222, example process 200 may comprise determining collision data in response to detecting a simulated collision. The collision data may be received as an output from the simulation data. The simulation data may comprise providing a portion of the simulated environment 216 to a simulated sensor, simulated sensor data to a perception component, simulated perception data to a planning component, and/or the like. In some examples, the simulation data may include two-dimensional data of a vehicle operating within an environment to validate performance of the controller and/or a system of the vehicle. The collision data may include data related to the distance travelled by the simulated vehicle 206 before encountering a collision, velocity data, mass data, collision direction, and other such data for the simulated vehicle 206 and the one or more objects involved in the collision. The collision data may include severity score data for the collision indicating the severity of the collision and/or the probability of fatality and/or injury as a result of the collision. Determining the collision data may include calculating the coefficient of restitution, identifying the type of collision, identifying the objects and the masses of the objects based on their bounding boxes, and other such determinations described herein. Results from the process illustrated in FIG. 2 may be used in aggregate to determine whether the controller is validated for use on a vehicle and/or whether additional inspections or changes need to be made.

Figure 3:
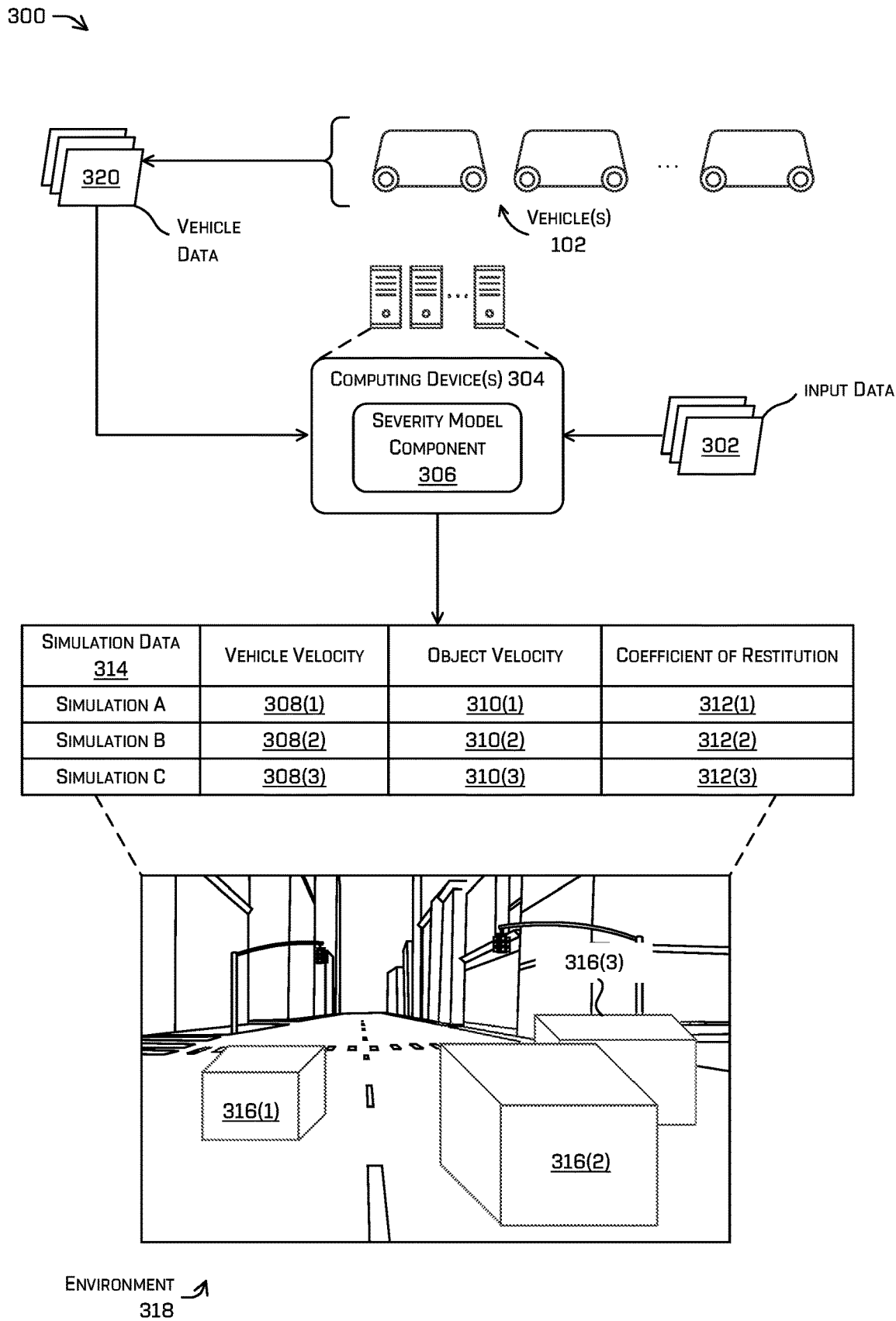
FIG. 3 illustrates an example flow diagram for generating simulation data of objects within an environment including coefficients of restitution for collisions between objects in the simulations.

FIG. 3 illustrates an example flow diagram 300 of using simulation data to determine severity scores for collisions including the simulated vehicle within a scenario (e.g., an environment 318). The scenario may be simulated on a computing device 304, such as the computing device(s) 134. To generate a scenario, input data 302 can be used. The input data 302 can include vehicle data 320 and/or additional situational data. The vehicle data 320 can, in some examples, include log data captured by a vehicle traveling through an environment 318. In some examples the vehicle data may be entirely simulated and defined by a user and/or automated program. In any case, the data may also be perturbed so as to vary one or more scenario parameters (e.g., slightly modifying positions, velocities, etc. of the instantiated objects). By way of example and without limitation, the additional situational data can include data such as an incident report from a third-party source. A third-party source can include a law enforcement agency, a department of motor vehicle, and/or a safety administration that can publish and/or store reports of activities and/or incidents. For example, a report can include a type of activity (e.g., a traffic hazard such as debris on a roadway, local flooding, etc.), a location, and/or a description of the activity. By way of example and without limitation, the report can describe that a driver, while operating a vehicle, struck a fallen tree branch in a roadway while traveling at a speed of 15 meters per second. The report can be used to generate a similar scenario that can be used in simulation.

In some instances, the additional situational data can include captured sensor data (e.g., image data). By way of example and without limitation, a driver of a vehicle can use a camera to capture image data while the driver operates the vehicle. In some instance, the image data can capture activity such as an incident. By way of example and without limitation, a driver can use a dashboard camera (e.g., a camera mounted on an interior dashboard of a vehicle) to capture image data while the driver operates the vehicle. As the driver operates the vehicle, an animal can run across the roadway and the driver can immediately brake to slow the vehicle. The dashboard camera can capture image data of the animal running across the roadway and the vehicle slowing down. The image data can be used to generate a scenario of an animal running across a roadway. As discussed above, a probability that is associated with a scenario can be determined to identify scenarios for simulation based on the probability meeting or exceeding a probability threshold. By way of example and without limitation, a probability threshold of 0.001% can be used where a likelihood of encountering a scenario is less than 0.001%, then scenarios with a higher probability can be prioritized for simulation and determining safety metrics associated with the scenarios with the higher probability. In some examples, only scenarios having less than or equal to the probability threshold may be used in order to ensure the vehicle is safe even in remotely possible scenarios. In still further examples, all scenarios may be used (or representatives, subsets, etc. may be used) and their output weighted based on the associated probability.

The input data 302, e.g., the vehicle data 320 and/or the additional situational data, can be used by a severity model component 306 to generate simulation data 314 for one or more simulations. For example, the input data 302 can be input into the severity model component 306 which can generate a synthetic environment that represents at least a portion of the input data 302 in the synthetic environment. Examples of generating scenarios and data generated by a vehicle that can be included in the vehicle representation 104 can be found, for example, in U.S. patent application Ser. No. 16/392,094 titled "Scenario Editor and Simulator" and filed Apr. 23, 2019 which is incorporated by reference in its entirety.

The severity model component 306 can be configured to scan the input data 302 to identify one or more scenarios represented in the input data 302. By way of example and without limitation, the severity model component 306 can determine that a portion of the input data 302 represents a pedestrian crossing a street without a right-of-way (e.g., without a crosswalk, at an intersection without a walk indication, and the like). In various examples, this may be performed by simple flags associated with the data associated with the various objects. In still other examples, such contexts may be determined by machine learned models trained to output a representation of the scene, including using natural language, embeddings, and the like. The severity model component 306 can identify this as a scenario (e.g., a jaywalking parameter) and label (and/or categorize) the scenario as, for example, a jaywalking scenario. Various different scenarios may be combined into one or more simulations within the simulation data 314. In at least some examples, such scenarios may be manually specified. For example, one or more users may designate certain scenarios to be tested to ensure that the vehicle is capable of safely operating when performing such scenarios, despite having never (or rarely) previously encountered the scenario. Of course, scenarios may be otherwise clustered based on, for example, embeddings, clustering algorithms over the enumerated scenarios (e.g., k-means), and the like.

The seventy model component 306 can execute the simulations as defined by the input data 302 as a set of simulation instructions and generate the simulation data 314. The simulation data 314 may include data describing the interactions of one or more objects 316(1), 316(2), 316(3) and may end or cease generation of simulation data upon detecting a collision between objects. For example, the severity model component 306 can instantiate a vehicle controller in the simulated scenario. In some instances, the severity model component 306 can execute multiple simulated scenarios simultaneously and/or in parallel. Additionally, the severity model component 306 can determine an outcome for the simulation. The simulation data 314 can include data relating to a collision that ends the simulation after a period of simulation. The time or distance elapsed before the collision may be recorded as part of the simulation data 314. The simulation data 314 may also include collision data describing a velocity 308(1), 308(2), 308(3) of the vehicle, a velocity 310(1), 310(2), 310(3) of the object, and a coefficient of restitution 312(1), 312(2), 312(3) for the collision. Additional collision data, such as the collision type, collision direction, masses of the objects and vehicles, and other such data may also be included in the simulation data 314.

Based on the simulation data 314, the severity model component 306 determines one or more severity scores for the collision. In at least some examples, the severity score may be calculated in one of several ways including based at least in part on several pre-defined formulae which may be selected based at least in part on the collision type (e.g., T-bone (up to a certain angle of incidence), rear-end, head on, side-swipe, etc.), occupant positions, etc. and may serve as a proxy for an amount of energy transferred to a passenger of either vehicle (indirectly standing in for a severity of the collision to the passenger). The severity scores may be used as a metric to evaluate the performance of the control system, as time or distance traveled by the autonomous vehicle before a collision of a particular severity occurs may be compared against benchmark data (e.g., real-world data of human driver distances traveled before a fatal collision or before a collision resulting in injury of a particular severity level). As above, this metric may be mathematically equivalent to a number of collisions, rates of severity, etc. The control system of the autonomous vehicle may be adapted to adjust an operating envelope, safety parameters, stopping distances, and other such factors in response to the metrics of the severity score to further improve the performance of the autonomous vehicle control system, as described in detail above. The severity score may be mapped or correspond with the MAIS or other such injury classification systems to evaluate the relative and/or absolute severity of the collision and resultant severity or likelihood of different injury classes to individuals. The severity score may also be correlated with a momentum change for a particular individual or energy involved in a particular collision to determine the severity of and/or probability of injury as a result of the collision. The MAIS score may classify a serious traffic injury on a scale of one to five with injuries having a score greater than or equal to three indicative of a serious traffic collision injury. The severity model component 306 may use one or more machine learning models to determine a severity score based on training data tagged with MAIS scores or other such scores. The severity model component 306 may also generate severity scores based on a continuum of data, such as a range of momentum involved with the collision, energy transferred during a collision, or other such factors.

The severity score may be used as a metric to evaluate the performance of the control system, as time or distance traveled by the autonomous vehicle before a collision of a particular severity occurs may be compared against benchmark data (e.g., real-world data of human driver distances traveled before a fatal collision or before a collision resulting in injury of a particular severity level). The control system of the autonomous vehicle may be adapted to adjust an operating envelope, safety parameters, stopping distances, and other such factors in response to the metrics of the severity score to further improve the performance of the autonomous vehicle control system. The severity score may be mapped or correspond with a maximum abbreviated injury scale (MAIS) or other classification system to evaluate the relative and/or absolute severity of the collision and resultant severity or likelihood of different injury classes to individuals. The severity score may also be correlated with a momentum change for a particular individual or energy involved in a particular collision to determine the severity of and/or probability of injury as a result of the collision. The MAIS score may classify a serious traffic injury on a scale of one to five with injuries having a score greater than or equal to three indicative of a serious traffic collision injury.

A computer system, such as computing device 304 may compare the severity scores against benchmarks and standards to ensure the autonomous vehicle control system meets or exceeds the benchmarks. The computing device can, based on the simulation data, determine various scenarios (collisions of various types), a frequency of the various scenarios (e.g., a time or distance traveled before a collision of a particular type), and regions of the environment that are associated with the various scenarios (e.g., locations where collisions are more likely to occur or occur more frequently). In some instances, the computing device can group similar scenarios represented in the simulation data. The similar events can be grouped together and may be compiled and used to determine averages and other statistically meaningful data describing the severity scores for collisions and distances traveled before collisions having certain severity scores are encountered.

Based at least in part on determining that the autonomous vehicle controller performed consistent with the predetermined outcome (that is, the autonomous vehicle controller did everything it was supposed to do and met or exceeded the benchmark) and/or determining that a rule was not broken or an assertion was not triggered, the severity model component 306 can determine that the autonomous vehicle controller succeeded. Based at least in part on determining that the autonomous vehicle controller performance was inconsistent with the predetermined outcome (that is, the autonomous vehicle controller did something that it wasn't supposed to do and/or did not meet or exceed the defined benchmark), the severity model component 306 can determine that the autonomous vehicle controller failed.

Accordingly, based at least in part on executing the scenarios, the simulation data 314, the severity scores, and other such data, an analysis component of the computing device 304 can be configured to determine degrees of a success or a failure. The analysis component can indicate how a vehicle performs in an environment and can be used to identify one or more scenarios or situations in which the control system of the vehicle did not meet or exceed the benchmark standards, for example highlighting specific scenarios or situations where one or more settings, algorithms (such as the planning component), or systems of the vehicle may be adjusted to improve performance of the vehicle and reduce the severity score, indicative of an increase in passenger safety relative to the benchmark.

Figure 4:
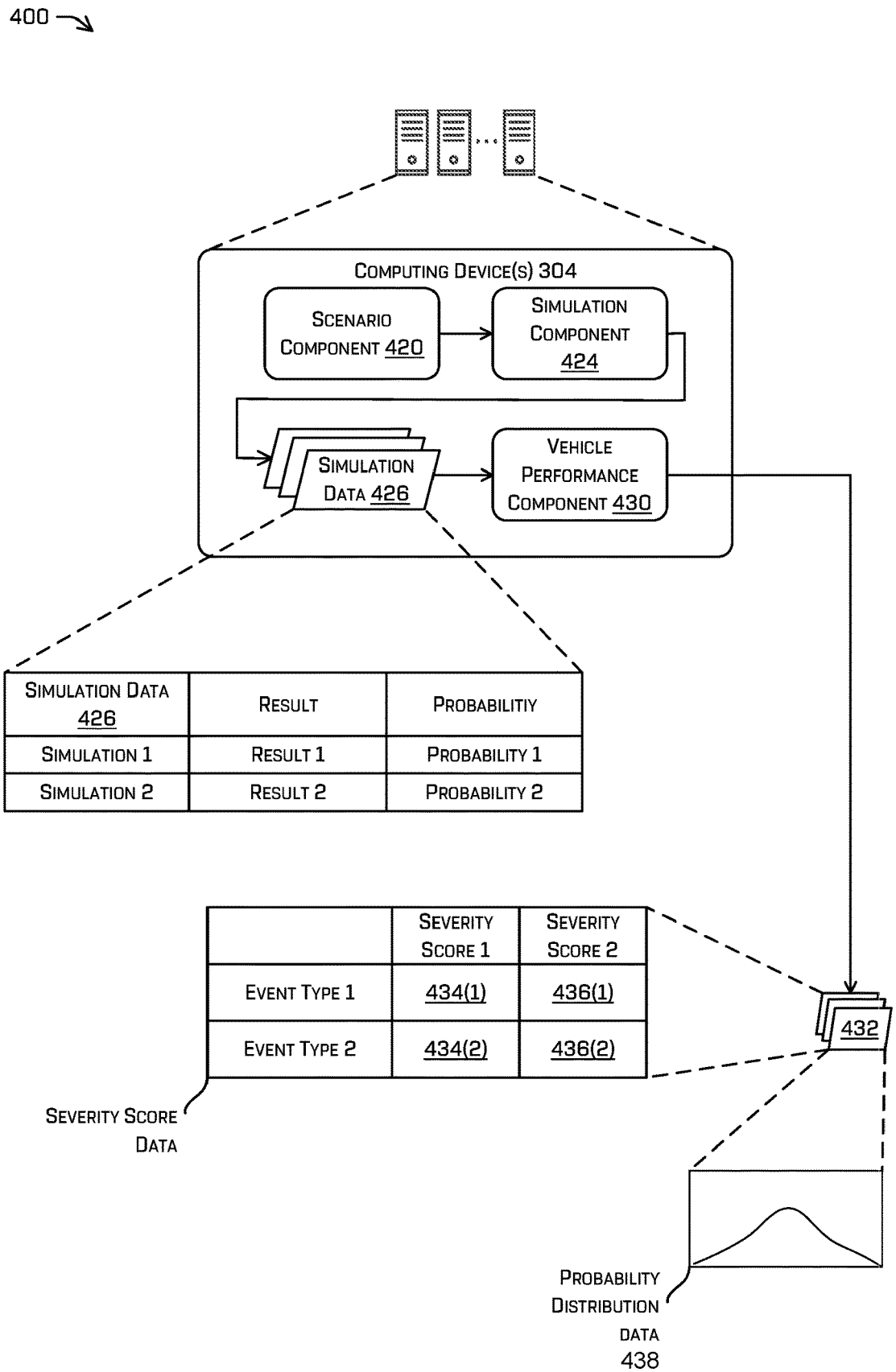
FIG. 4 illustrates an example using simulation data to generate severity scores for simulated collisions of an autonomous vehicle within a simulated environment.

FIG. 4 illustrates an example block diagram 400 of using a severity model to determine one or more severity scores for a collision simulated in a simulated environment. As discussed above, the computing device 304 can include one or more components to simulate one or more scenarios, generate severity scores, and analyze vehicle performance. As depicted, the computing device 304 includes a scenario component 420, a simulation component 424, simulation data 426, and a vehicle performance component 430. One or more of the components shown in the computing device 304 may be embodied in the severity model component 306 of FIG. 3. The simulation component 424 can use the scenario data from the scenario component 420 to simulate one or more scenarios as described above within a simulated environment where a vehicle navigates.

The simulation component 424 produces simulation data 426 that may include data related to one or more collisions during the course of the simulation and may also include one or more probabilities related to events occurring with the simulation. For example, after running any number of simulations one or more times (which may comprise various perturbations in the one or more times) a probability of different types of collisions may be determined. Such information may be used to identify patterns or trends within the simulations to identify potential areas for improvement of a vehicle control system.

A vehicle performance component 430 may receive the simulation data 426, including the collision data described herein and may produce severity score data 432. The severity score data 432 may describe one or more severity scores for a plurality of different collisions gathered from multiple simulations from the simulation components 424. The vehicle performance component 430 may generate one or more severity scores 434(1) and 434(2) for the vehicle and may also include one or more severity scores 436(1) and 436(2) for the object involved in a collision with the vehicle. The severity score data 432 may include severity scores for each event, such as each collision that may be sorted by severity, event type, collision type, and other such filters to identify patterns or areas for improvement of the vehicle control system by adjusting one or more parameters or algorithms of the vehicle control system.

In some examples, the severity score data 432 includes probability distribution data 438 from one or more simulations performed and severity scores generated from the various simulations. The probability distribution data 438 may describe the probability or distribution of probabilities of particular events, for example, describing a probability distribution of a fatality event over a course of 100, 1,000, or 10,000 simulations. Additional statistics may be generated based on simulation data from multiple simulations that may be included with the probability distribution data 438.

Figure 5:
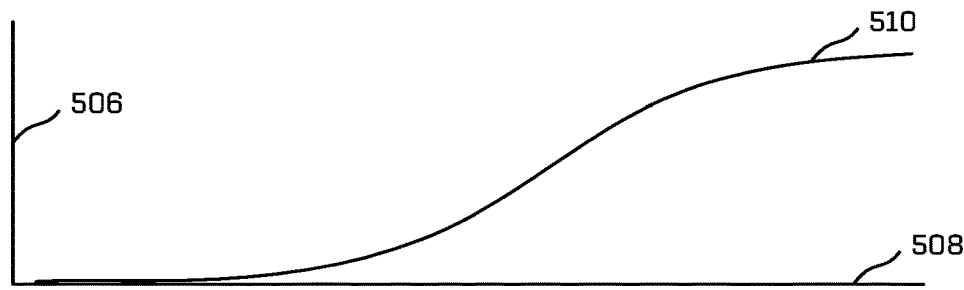
FIG. 5 illustrates example risk profiles for different collision types that may be used for generating severity scores.
Figure 5:
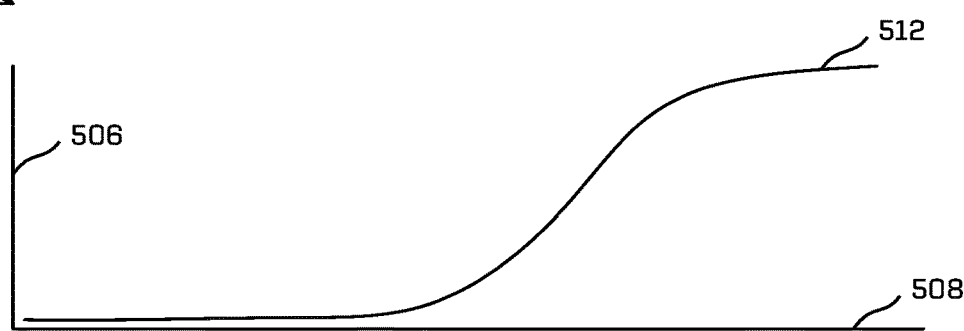
Figure 5:
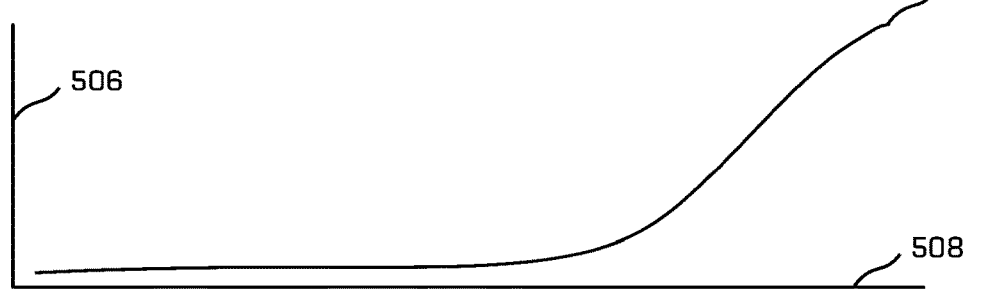

FIG. 5 illustrates risk profiles for different collision types that may be used for generating severity scores. The risk profiles 502, 504, and 506 are examples of different risk functions 510, 512, and 514 that may be used for determining a probability of injury and/or fatality for a passenger in a vehicle. The risk profiles are shown as risks 506 or probabilities on the vertical (Y) axis as a function of impact speed 508 (velocity difference between colliding bodies) on the horizontal (X) axis. The risk profiles 502, 504, and 506 are generated using the following risk calculation where the factor z is used to generate different profiles based on different collision types. The factor z includes constants as well as a multiplier that may be applied to the independent variable (impact speed).

$$\text{Risk} = \frac{1}{1 + e^{-z}}$$

The risk profiles 502, 504, and 506 may be used to determine a severity score based on the probability of injury or fatality output by the risk equation above. In some examples the functions may define a probability of fatality as a function of velocity difference between the objects. In some examples various functions may be used to determine a risk for each person involved in the collision (object and vehicle occupants). A probability of injury may be determined based on a multiplier of the probability of fatality, for example by using a multiplier of one hundred times the probability of fatality to determine a probability of injury. In some examples functions may be defined using experiential data, such as from a vehicle collision database. In some examples, the functions may include functions for different ratings or classes of injuries, for example with different functions for each of the different classes of injuries used in the MAIS scoring system and each function describing a probability of an injury having a particular MAIS score.

The risk profile 500 corresponds to a risk of pedestrian fatality in a vehicle versus pedestrian crash. The risk profile 502 corresponds to a risk of occupant fatality in a vehicle-to-vehicle frontal crash for vehicles of similar sizes. The risk profile 504 corresponds to a risk of occupant fatality in a vehicle-to-vehicle side impact crash for vehicles of similar sizes. Additional risk profiles may be generated and used that incorporate different variables such as other collision directions, variable vehicle sizes, etc. The collision types may include information such as the direction of the collision (frontal crash, side impact, glancing impact, etc.) as well as the relative velocity between the objects at the time of the collision. In some examples, different functions may be determined based on collision types relating to vehicle and object sizes (e.g., vehicle versus similarly sized vehicle, vehicle versus pedestrian sized object, vehicle versus larger vehicle, etc.). A collection of functions may be defined and used to determine a probability of injury and/or fatality.

Figure 6:
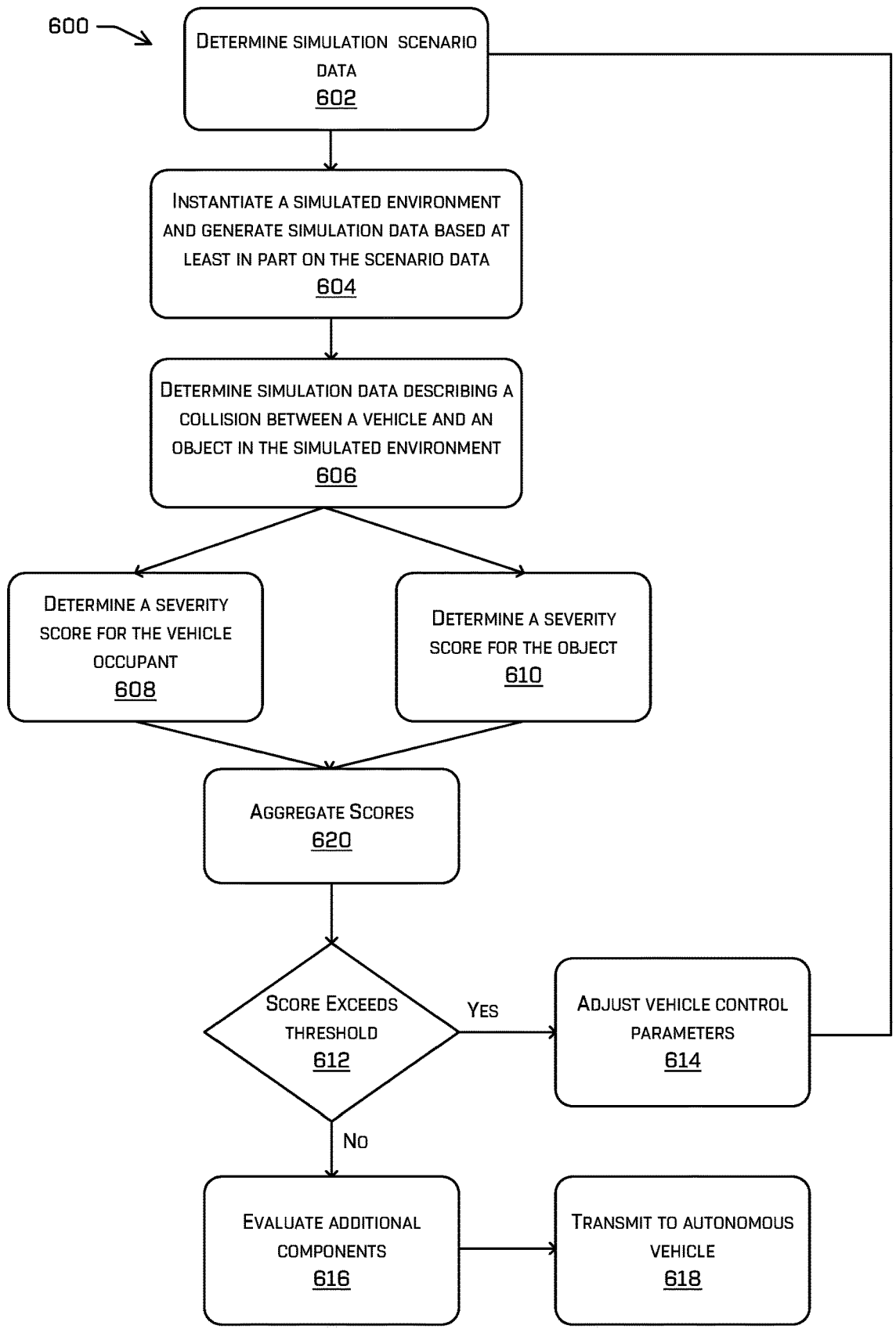
FIG. 6 illustrates an example process for generating severity scores for simulations of collisions between simulated objects in a simulated environment.

FIG. 6 illustrates a process 600 for generating severity scores for simulations of collisions between simulated objects in a simulated environment. The process 600 may be performed by one more processors of one or more computing devices, such as computing device(s) 134 or other computing devices described herein. The process 600 may be embodied in computer-readable instructions stored on a non-transitory computer readable medium that are executable by one or more processors to perform the process 600.

At 602, the process 600 includes determining simulation scenario data. As described herein, the simulation may include a simulated environment, one or more vehicles, and one or more objects. The scenario data may define the parameters of the simulation, for example to operate the simulated vehicle in the simulated environment according to a vehicle controller until a collision is detected with another vehicle or an object. The scenario data may include information related to the sizes, masses, speeds, and other such data for the vehicles and objects in the simulated environment. In some examples the scenario data may be based on log data from one or more autonomous vehicles.

At 604, the process 600 includes instantiating the simulated environment and generating simulation data based at least in part on the scenario data. The simulated environment may be simulated on one or more computing devices and may include simulating the environment in multiple different parallel simulations simultaneously in some examples. The simulated environment may be operated at an accelerated speed to condense operating time and reduce time to simulate the environment until an event occurs. An event to end a simulation may include a collision of the simulated vehicle with another simulated object such as a vehicle, pedestrian, or other object.

At 606, the process 600 includes determining simulation data describing a collision between the simulated vehicle and an object in the simulated environment. The simulation data may include information about the collision including the sizes of the objects, the direction of travel of each, the speed of each, etc. that may be used to determine the impact of the collision on all simulated parties involved. The simulation data may be generated in real-time or may be generated at the conclusion of the simulation. In some examples the collision detected within the simulation may cause the simulation to cease until a new simulation is begun according to the process 600 at 602.

At 608, the process 600 includes determining a severity score for an occupant of the simulated vehicle. The collision between the vehicle and the object may be analyzed to determine a severity of the collision and one or more probabilities associated with the collision including a probability of injury or fatality as a result of the collision. The severity of the collision may be scaled, based on the probability of injury and/or fatality to a severity score. The severity score, which may correspond to the probability of injury and/or fatality, is based on one or more functions describing the probability of injury and/or a probability of injury of a particular type. The severity score may be determined, in some examples, using one or more machine learning models based on training data tagged with MAIS scores or other such scores.

In an example, the underlying functions, shown in FIG. 5, may reflect a probability of fatality for different collision types. The collision types may include information such as the direction of the collision (frontal crash, side impact, glancing impact, etc.) as well as the relative velocity between the objects at the time of the collision. In some examples, different functions may be determined based on collision types relating to vehicle and object sizes (e.g., vehicle versus similarly sized vehicle, vehicle versus pedestrian sized object, vehicle versus larger vehicle, etc.). A collection of functions may be defined and used to determine a probability of injury and/or fatality. In some examples the functions may define a probability of fatality as a function of velocity difference between the objects. A probability of injury may be determined based on a multiplier of the probability of fatality, for example by using a multiplier of one hundred times the probability of fatality to determine a probability of injury. In some examples functions may be defined using experiential data, such as from a vehicle collision database. In some examples, the functions may include functions for different ratings or classes of injuries, for example with different functions for each of the different classes of injuries used in the MAIS scoring system and each function describing a probability of an injury having a particular MAIS score.

The severity score may also be based on collision data that includes the momentum involved in the collision, energy present within the environment of the collision (total energy and/or energy exchanged or transferred), coefficient of restitution, which may be determined based on the conservation of momentum within the environment, and other such factors. The coefficient of restitution may be calculated using the masses of the objects involved in the collision as determined based on the bounding boxes of each described above.

At 610, the process 600 includes determining a severity score for the object in the collision with the simulated vehicle. The severity score for the object may be determined similar to the manner of determining the severity score for the simulated vehicle occupant described herein.

At 620, the process 600 includes aggregating scores from one or more simulations. In some examples the process 600 may be performed on multiple simulations, such that multiple scenarios are simulated either sequentially or in parallel with one another, each simulation generating simulation data as described herein as well as severity scores for vehicle occupants and objects. The severity scores may be aggregated to determine an aggregate severity score. The aggregate severity score may be aggregated based on different scenario information. For example, severity scores for similar collision types (e.g., front, glancing, T-bone, rear, etc.), for different relative vehicle and object sizes (e.g., relatively larger object than vehicle, relatively smaller object than vehicle, object smaller than the vehicle by a multiplier, object larger than vehicle by a multiplier, object and vehicle roughly the same size and/or mass, etc.), vehicle speed, object speed, differential speed, etc. The different severity scores for each of the different collision types may be aggregated by performing one or more statistical analyses, for example to determine an average, standard deviation, mode, or other such statistical information that may be used to aggregate the various severity scores. In some examples, the aggregated severity score may be for the vehicle occupant while a separate aggregated score may be for the object. In some examples, the aggregated severity score may be based on a combination of severity scores for both the vehicle occupant and the object, generating an overall aggregated collision severity score for different collision types.

At 612, the process includes determining whether the severity score, a collection of severity scores, or other metric describing the collisions exceeds a threshold. The threshold may be based on one or more benchmarks or safety standards. The severity scores for a plurality of simulations may be aggregated to produce a set of severity scores that may be evaluated to determine a probability of collisions having a threshold level of severity after a predetermined distance travelled by the simulated vehicle. Such data may be compared against benchmarks to identify areas for improvement in the control of the simulated vehicle.

At 614, the process 600 includes adjusting one or more operating parameters of the vehicle control system, such as an operating envelope size, a minimum following distance, a braking distance, or other such parameter of the vehicle control system. The parameters may be identified based on the aggregated severity scores, for example to identify scenarios where particular collisions exceed a severity score threshold and adjusting a control parameter to reduce a likelihood or severity of such collision types. After adjusting the one or more vehicle control parameters, the adjusted vehicle control system may be simulated by the process 600 by returning to 602 and initiating a new simulation using the adjusted control system.

At 616, the process 600 may include evaluating one or more additional components or additional scenarios. In some examples the additional scenarios may include simulating environments or conditions where one or more components malfunctions or fails. In some examples the additional simulation may be focused on one or more additional components of the vehicle besides the control system to verify performance of the components.

At 618, the process 600 may include transmitting the control system or simulated component parameters to an autonomous vehicle. The transmitted data may include the specifics of a control system for one or more subsystems of an autonomous vehicle. The autonomous vehicle may be configured to operate in a real-world environment by running the control system transmitted from the simulation system. In some examples the transmitted data may be conveyed following determination that the severity score is below a threshold. In some examples the control system may be transmitted after additional components are tested at 616.

Figure 7:
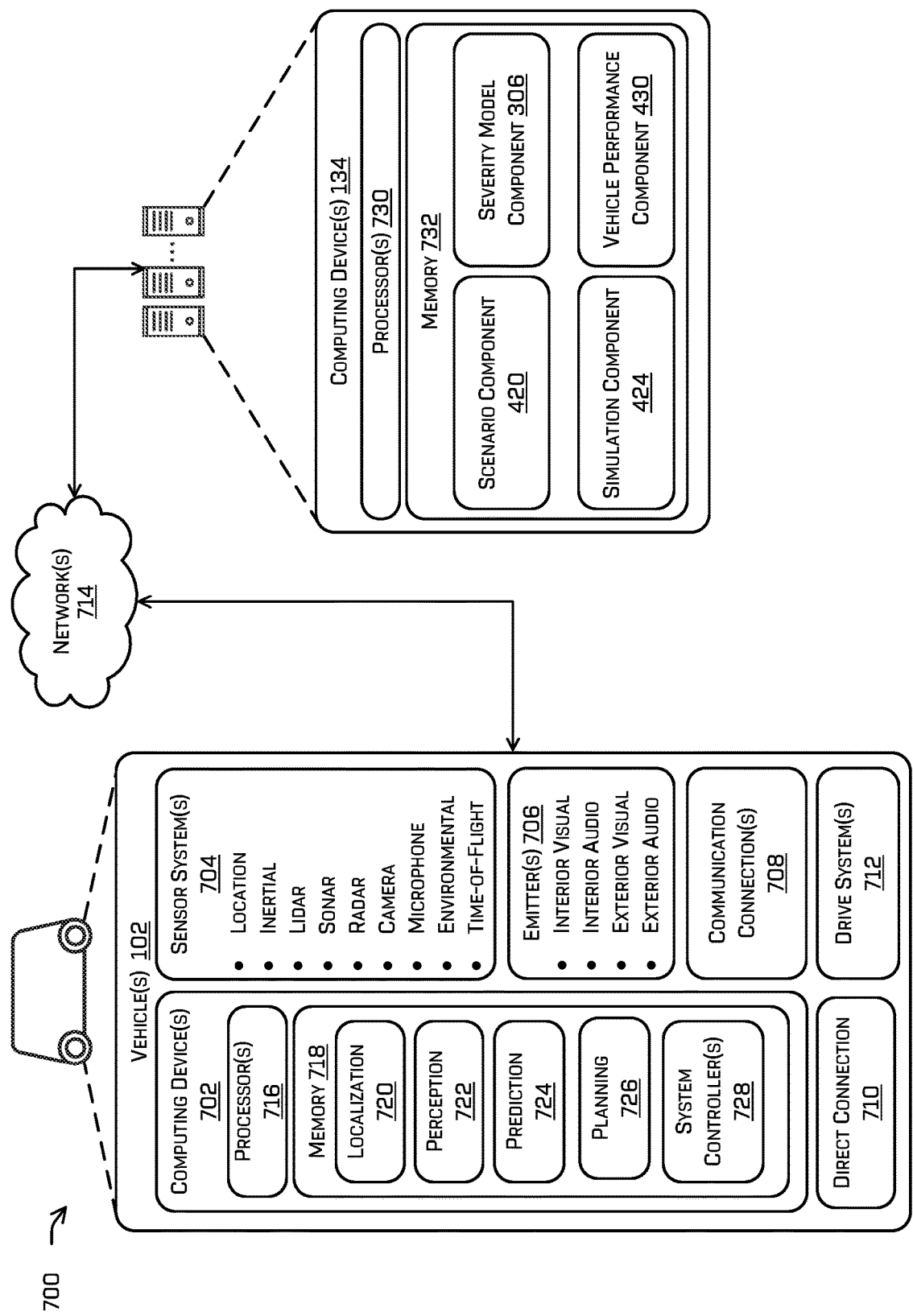
FIG. 7 depicts a block diagram of an example system for implementing the techniques described herein.

FIG. 7 depicts a block diagram of an example system 700 for implementing the techniques discussed herein. In at least one example, the example system 700 can include a vehicle(s) 102. In the example system 700, the vehicle(s) 102 is an autonomous vehicle; however, the vehicle(s) 102 can be any other type of vehicle (e.g., a driver-controlled vehicle that may provide an indication of whether it is safe to perform various maneuvers).

The vehicle(s) 102 can include a computing device(s) 702, one or more sensor system(s) 704, one or more emitter(s) 706, one or more communication connection(s) 708 (also referred to as communication devices and/or modems), at least one direct connection 710 (e.g., for physically coupling with the vehicle(s) 102 to exchange data and/or to provide power), and one or more drive system(s) 712. The one or more sensor system(s) 704 can be configured to capture sensor data associated with an environment.

The sensor system(s) 704 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 704 can include multiple instances of each of these or other types of sensors. For instance, the time-of-flight sensors can include individual time-of-flight sensors located at the corners, front, back, sides, and/or top of the vehicle(s) 102. As another example, the camera sensors can include multiple cameras disposed at various locations about the exterior and/or interior of the vehicle(s) 102. The sensor system(s) 704 can provide input to the computing device(s) 702.

The vehicle(s) 102 can also include one or more emitter(s) 706 for emitting light and/or sound. The one or more emitter(s) 706 in this example include interior audio and visual emitters to communicate with passengers of the vehicle(s) 102. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 706 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle(s) 102 can also include one or more communication connection(s) 708 that enable communication between the vehicle(s) 102 and one or more other local or remote computing device(s) (e.g., a remote teleoperations computing device) or remote services. For instance, the communication connection(s) 708 can facilitate communication with other local computing device(s) on the vehicle(s) 102 and/or the drive system(s) 712. Also, the communication connection(s) 708 can allow the vehicle(s) 102 to communicate with other nearby computing device(s) (e.g., other nearby vehicles, traffic signals, etc.).

The communications connection(s) 708 can include physical and/or logical interfaces for connecting the computing device(s) 702 to another computing device or one or more network(s) 714 (e.g., the Internet). For example, the communications connection(s) 708 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 708 may comprise the one or more modems as described in detail above.

In at least one example, the vehicle(s) 102 can include one or more drive system(s) 712. In some examples, the vehicle(s) 102 can have a single drive system. In at least one example, if the vehicle(s) 102 includes more than one drive system(s) 712, a single one of the drive system(s) 712 can be positioned on opposite ends of the vehicle(s) 102 (e.g., the front and the rear, etc.). In at least one example, the drive system(s) 712 can include one or more sensor system(s) 704 to detect conditions of the drive system(s) 712 and/or the surroundings of the vehicle(s) 102. By way of example and not limitation, the sensor system(s) 704 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 712. In some cases, the sensor system(s) 704 on the drive system(s) 712 can overlap or supplement corresponding systems of the vehicle(s) 102 (e.g., sensor system(s) 704).

The drive system(s) 712 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 712 can include a drive system controller which can receive and preprocess data from the sensor system(s) 704 and to control operation of the various vehicle systems. In some examples, the drive system controller can include one or more processor(s) and memory communicatively coupled with the one or more processor(s). The memory can store one or more modules to perform various functionalities of the drive system(s) 712. Furthermore, the drive system(s) 712 also include one or more communication connection(s) that enable communication by the respective drive system with one or more other local or remote computing device(s).

The computing device(s) 702 can include one or more processor(s) 730 and memory 732 communicatively coupled with the one or more processor(s) 716. In the illustrated example, the memory 718 of the computing device(s) 702 stores a localization component 720, a perception component 722, a prediction component 724, a planning component 726, and one or more system controller(s) 728. Though depicted as residing in the memory 718 for illustrative purposes, it is contemplated that the localization component 720, the perception component 722, the prediction component 724, the planning component 726, and the one or more system controller(s) 728 can additionally, or alternatively, be accessible to the computing device(s) 702 (e.g., stored in a different component of vehicle(s) 102 and/or be accessible to the vehicle(s) 102 (e.g., stored remotely).

In memory 718 of the computing device(s) 702, the localization component 720 can include functionality to receive data from the sensor system(s) 704 to determine a position of the vehicle(s) 102. For example, the localization component 720 can include and/or request/receive a three-dimensional map of an environment and can continuously determine a location of the autonomous vehicle within the map. In some instances, the localization component 720 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 720 can provide data to various components of the vehicle(s) 102 to determine an initial position of an autonomous vehicle for generating a trajectory, as discussed herein.

The perception component 722 can include functionality to perform object detection, segmentation, and/or classification. In some examples, the perception component 722 can provide processed sensor data that indicates a presence of an entity that is proximate to the vehicle(s) 102 and/or a classification of the entity as an entity type (e.g., car, pedestrian, cyclist, building, tree, road surface, curb, sidewalk, unknown, etc.). In additional and/or alternative examples, the perception component 722 can provide processed sensor data that indicates one or more characteristics (also referred to as parameters) associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, a geographic position, an indication of darkness/light, etc.

The perception component 722 can include functionality to store perception data generated by the perception component 722. In some instances, the perception component 722 can determine a track corresponding to an object that has been classified as an object type. For purposes of illustration only, the perception component 722, using sensor system(s) 704 can capture one or more images of an environment. The sensor system(s) 704 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 704, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (collections of historical positions, orientations, sensor features, etc. associated with the object over time) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 724 can generate one or more probability maps representing prediction probabilities of possible locations of one or more objects in an environment. For example, the prediction component 724 can generate one or more probability maps for vehicles, pedestrians, animals, and the like within a threshold distance from the vehicle(s) 102. In some instances, the prediction component 724 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 726 can determine a path for the vehicle(s) 102 to follow to traverse through an environment. For example, the planning component 726 can determine various routes and paths and various levels of detail. In some instances, the planning component 726 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 726 can generate an instruction for guiding the autonomous vehicle along at least a portion of the route from the first location to the second location. In at least one example, the planning component 726 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 726 can alternatively, or additionally, use data from the perception component 722 to determine a path for the vehicle(s) 102 to follow to traverse through an environment. For example, the planning component 726 can receive data from the perception component 722 regarding objects associated with an environment. Using this data, the planning component 726 can determine a route to travel from a first location (e.g., a current location) to a second location (e.g., a target location) to avoid objects in an environment. In at least some examples, such a planning component 726 may determine there is no such collision free path and, in turn, provide a path which brings vehicle(s) 102 to a safe stop avoiding all collisions and/or otherwise mitigating damage.

In at least one example, the computing device(s) 702 can include one or more system controller(s) 728, which can be configured to control steering, propulsion, braking, safety, emitters, communication, and other systems of the vehicle(s) 102. These system controller(s) 728 can communicate with and/or control corresponding systems of the drive system(s) 712 and/or other components of the vehicle(s) 102, which may be configured to operate in accordance with a path provided from the planning component 726.

The vehicle(s) 102 can connect to computing device(s) 134 via network(s) 714 and can include one or more processor(s) 730 and memory 732 communicatively coupled with the one or more processor(s) 730. In at least one instance, the one or more processor(s) 730 can be similar to the processor(s) 716 and the memory 732 can be similar to the memory 718. In the illustrated example, the memory 732 of the computing device(s) 134 stores a scenario component 420, a severity model component 306, a simulation component 424, and a vehicle performance component 430 as described herein. Though depicted as residing in the memory 732 for illustrative purposes, it is contemplated that the components can additionally, or alternatively, be accessible to the computing device(s) 134 (e.g., stored in a different component of computing device(s) 134 and/or be accessible to the computing device(s) 134 (e.g., stored remotely).

The processor(s) 716 of the computing device(s) 702 and the processor(s) 730 of the computing device(s) 134 can be any suitable processor capable of executing instructions to process data and perform operations as described herein. By way of example and not limitation, the processor(s) 716 and 730 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 718 computing device(s) 702 and the memory 732 of the computing device(s) 134 are examples of non-transitory computer-readable media. The memory 718 and 732 can store an operating system and one or more software applications, instructions, programs, and/or data to implement the methods described herein and the functions attributed to the various systems. In various implementations, the memory 718 and 732 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 718 and 732 can be implemented as a neural network.

Example Clauses

A: A system comprising: one or more processors; and memory storing instructions that when executed by the one or more processors, configure the system to perform operations comprising: determining a scenario for simulating operation of an autonomous vehicle, the scenario comprising a simulated environment and an object positioned within the simulated environment; simulating the scenario by simulating operation of the autonomous vehicle based at least in part on operating a component of the autonomous vehicle in the scenario; determining, based at least in part on simulating the scenario, simulation data describing a collision between the autonomous vehicle and the object by at least: determining a mass of the object; determining a velocity of the object; determining a velocity of the autonomous vehicle; determining a mass of the autonomous vehicle; determining a collision type; and determining a coefficient of restitution for the collision based on the mass of the object, velocity of the object, mass of the autonomous vehicle, and velocity of the autonomous vehicle; determining, based at least in part on the simulation data, a severity score for the collision; adjusting the component of the autonomous vehicle based at least in part on determining that the severity score exceeds a threshold; and transmitting the component to a real-world autonomous vehicle.

B. The system of paragraph A, wherein determining that the severity score exceeds the threshold comprises comparing an aggregate severity score representative of a combined severity score over a plurality of simulations against the threshold.

C. The system of paragraph A, wherein determining the scenario comprises receiving log data comprising a detection of the object in a real environment, the detection associated with a bounding box, wherein the mass of the object is based at least in part on a size of the bounding box.

D. The system of paragraph A, wherein adjusting the component of the autonomous vehicle comprises modifying a safety parameter including at least one of a vehicle envelope size, a vehicle envelope shape, or vehicle safety maneuver.

E. The system of paragraph A, wherein adjusting the component of the autonomous vehicle comprises: identifying a collision scenario based at least in part on an aggregate of severity score data from a plurality of simulations; determining that the aggregate of the severity score data exceeds a second threshold; and adjusting a parameter of the component of the autonomous vehicle based at least in part on the collision scenario.

F. The system of paragraph A, wherein the aggregate of severity score data is generated by at least: classifying one or more collisions from the simulation data based at least in part on the collision type; and generating the aggregate of severity score data by determining an average severity score for individual collision types.

G. A method, comprising: determining a scenario for simulating operation of a vehicle in a simulated environment; simulating the scenario by simulating operation of the vehicle based at least in part on a component of the vehicle; determining, based at least in part on simulating the scenario, simulation data describing a collision between the vehicle and an object in the simulated environment based at least in part on a property of the vehicle relative to the object; determining a collision type of the collision; determining, based at least in part on the simulation data and the collision type, a severity score for the collision; determining an aggregated severity score based on the simulation data and the severity score, the aggregated severity score associated with the collision type; and adjusting the component of the vehicle based at least in part on the aggregated severity score exceeding a threshold.

H. The method of paragraph G, wherein determining the aggregated severity score comprises determining an average severity score for a plurality of collisions, the plurality of collisions selected based on the collision type.

I. The method of paragraph H, wherein the collision type comprises at least one of a collision direction and a relative size of the object and the vehicle.

J. The method of paragraph G, wherein determining the simulation data comprises receiving log data comprising a detection of the object in a real environment and a movement of the object in the real environment.

K. The method of paragraph J, wherein the detection of the object is associated with a bounding box, wherein a mass of the object is based at least in part on a size of the bounding box and the property of the vehicle relative to the object comprises a coefficient of restitution.

L. The method of paragraph G, further comprising transmitting the component to a real world vehicle based at least in part on the aggregated severity score being below a threshold.

M. The method of paragraph G, wherein adjusting the component of the vehicle comprises: identifying a collision scenario based at least in part on an aggregate of severity score data from a plurality of simulations, the aggregate of the severity score data exceeding a threshold; and adjusting a parameter of the component of the vehicle based at least in part on the collision scenario.

N. The method of paragraph M, wherein the aggregate of severity score data is generated by at least: classifying one or more collisions from the simulation data based at least in part on the collision type; and generating the aggregate of severity score data by determining an average severity score for individual collision types.

O. A non-transitory computer-readable medium storing instructions executable by a processor, wherein the instructions, when executed, cause the processor to perform operations comprising: determining a scenario for simulating operation of a vehicle in a simulated environment; simulating the scenario by simulating operation of the vehicle based at least in part on a component of the vehicle; determining, based at least in part on simulating the scenario, simulation data describing a collision between the vehicle and an object in the simulated environment based at least in part on a property of the vehicle relative to the object; determining a collision type of the collision; determining, based at least in part on the simulation data and the collision type, a severity score for the collision; determining an aggregated severity score based on the simulation data and the severity score, the aggregated severity score associated with the collision type; and adjusting the component of the vehicle based at least in part on the aggregated severity score exceeding a threshold.

P. The non-transitory computer-readable medium of paragraph O, wherein determining the simulation data comprises receiving log data comprising a detection of the object in a real environment and a movement of the object in the real environment.

Q. The non-transitory computer-readable medium of paragraph P, wherein the detection of the object is associated with a bounding box, wherein a mass of the object is based at least in part on a size of the bounding box and the property of the vehicle relative to the object comprises a coefficient of restitution.

R. The non-transitory computer-readable medium of paragraph O, wherein adjusting the component of the vehicle comprises: identifying a collision scenario based at least in part on an aggregate of severity score data from a plurality of simulations, the aggregate of the severity score data exceeding a threshold; and adjusting a parameter of the component of the vehicle based at least in part on the collision scenario.

S. The non-transitory computer-readable medium of paragraph R, wherein the aggregate of severity score data is generated by at least: classifying one or more collisions from the simulation data based at least in part on the collision type; and generating the aggregate of severity score data by determining an average severity score for individual collision types.

T. The non-transitory computer-readable medium of paragraph S, wherein determining the aggregated severity score comprises determining an average severity score for a plurality of collisions, the plurality of collisions selected based on the collision type.

While the example clauses described above are described with respect to one particular implementation, it should be understood that, in the context of this document, the content of the example clauses can also be implemented via a method, device, system, computer-readable medium, and/or another implementation.

Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:
1. A system comprising:
one or more processors; and
memory storing instructions that when executed by the one or more processors, configure the system to perform operations comprising:

determining a scenario for simulating operation of an autonomous vehicle, the scenario comprising a simulated environment and an object positioned within the simulated environment;

setting an experimental parameter of a component of the autonomous vehicle in the scenario, wherein the experimental parameter comprises a value controlling an operation of the component during the operation of the autonomous vehicle in the scenario;

simulating the scenario by simulating operation of the autonomous vehicle based at least in part on using the experimental parameter when operating the component of the autonomous vehicle in the scenario;

determining, based at least in part on simulating the scenario, a simulated collision;

determining simulation data describing the simulated collision between the autonomous vehicle and the object by at least:
  determining a mass of the object;
  determining a velocity of the object;
  determining a velocity of the autonomous vehicle;
  determining a mass of the autonomous vehicle;
  determining at least one of an occupant position or a pedestrian position;
  determining a collision type; and
  determining a coefficient of restitution for the simulated collision based on the mass of the object, velocity of the object, mass of the autonomous vehicle, and velocity of the autonomous vehicle;

determining, based at least in part on the simulation data, an initial severity score for the simulated collision indicating a gradated score of how severe the simulated collision is;

determining, based at least in part on scaling the initial severity score by a scalar associated with a risk profile determined based at least in part on the collision type, an updated severity score, wherein the risk profile is based at least in part on a logistic function describing a probability of injury;

adjusting at least one operating parameter of the component of the autonomous vehicle based at least in part on determining that the updated severity score exceeds a threshold to obtain an updated component configuration, wherein the at least one operating parameter includes the experimental parameter; and transmitting the updated component configuration to a real-world autonomous vehicle.

2. The system of claim 1, wherein determining that the updated severity score exceeds the threshold comprises comparing an aggregate severity score representative of a combined severity score over a plurality of simulations against the threshold.

3. The system of claim 1, wherein determining the scenario comprises receiving log data comprising a detection of the object in a real environment, the detection associated with a bounding box,
  wherein determining the mass of the object comprises approximating the mass based at least in part on a size of the bounding box.

4. The system of claim 1, wherein adjusting the at least one operating parameter of the component of the autonomous vehicle comprises modifying a safety parameter including at least one of a vehicle envelope size, a vehicle envelope shape, a vehicle stopping distance, a vehicle sensor parameter, a vehicle drive system parameter, or vehicle trajectory selection parameter.

5. The system of claim 1, wherein adjusting the at least one operating parameter of the component of the autonomous vehicle comprises:
  identifying a collision scenario based at least in part on an aggregate of severity score data from a plurality of simulations;
  determining that the aggregate of the severity score data exceeds a second threshold; and
  adjusting the at least one operating parameter of the component of the autonomous vehicle based at least in part on the collision scenario.

6. The system of claim 5, wherein the aggregate of severity score data is generated by at least:
  classifying one or more collisions from the simulation data based at least in part on the collision type; and
  generating the aggregate of severity score data by determining an average severity score for individual collision types.

7. The system of claim 1, wherein the updated component configuration is based at least in part on additional data describing at least one of additional components, additional simulations, or updated simulations.

8. A method, comprising:
  determining a scenario for simulating operation of a vehicle in a simulated environment, the scenario comprising an object positioned within the simulated environment;
  setting an experimental parameter of a component of the vehicle in the scenario, wherein the experimental parameter comprises a value controlling an operation of the component during the operation of the vehicle in the scenario;
  simulating the scenario by simulating operation of the vehicle based at least in part on using the experimental parameter when operating the component of the vehicle;
  determining, based at least in part on simulating the scenario, a simulated collision;
  determining simulation data describing the simulated collision between the vehicle and the object in the simulated environment by at least:
    determining a mass of the object;
    determining a velocity of the object;
    determining a velocity of the vehicle;
    determining a mass of the vehicle;
    determining at least one of an occupant position or a pedestrian position;
    determining a collision type of the simulated collision; and
    determining a coefficient of restitution for the simulated collision based on the mass of the object, the velocity of the object, the mass of the vehicle, and the velocity of the vehicle;
  determining, based at least in part on the simulation data, an initial severity score for the simulated collision indicating a gradated score of how severe the simulated collision is;
  determining an updated severity score, based at least in part on scaling the initial severity score by a scalar associated with a risk profile determined based at least in part on the collision type, wherein the risk profile is based at least in part on a logistic function describing a probability of injury;
  determining an aggregated severity score based on the simulation data and the updated severity score, the aggregated severity score associated with the collision type; and adjusting a configuration of the component of the vehicle based at least in part on the aggregated severity score exceeding a threshold.

9. The method of claim 8, wherein determining the aggregated severity score comprises determining an average severity score for a plurality of collisions, the plurality of collisions selected based on the collision type.

10. The method of claim 9, wherein the collision type comprises at least one of a collision direction and a relative size of the object and the vehicle.

11. The method of claim 8, wherein determining the simulation data comprises receiving log data comprising a detection of the object in a real environment and a movement of the object in the real environment.

12. The method of claim 11, wherein the detection of the object is associated with a bounding box, wherein a mass of the object is approximated based at least in part on a size of the bounding box.

13. The method of claim 8, further comprising transmitting the configuration of the component to a real world vehicle based at least in part on the aggregated severity score being below a second threshold.

14. The method of claim 8, wherein adjusting the configuration of the component of the vehicle comprises:
identifying a collision scenario based at least in part on an aggregate of severity score data from a plurality of simulations, the aggregate of the severity score data exceeding a threshold; and
adjusting at least one operational parameter of the component of the vehicle based at least in part on the collision scenario, wherein the at least one operational parameter may be the experimental parameter.

15. The method of claim 14, wherein the aggregate of severity score data is generated by at least:
classifying one or more collisions from the simulation data based at least in part on the collision type; and
generating the aggregate of severity score data by determining an average severity score for individual collision types.

16. A non transitory computer readable medium storing instructions executable by a processor, wherein the instructions, when executed, cause the processor to perform operations comprising:
determining a scenario for simulating operation of a vehicle in a simulated environment, the scenario comprising an object positioned within the simulated environment;
setting an experimental parameter of a component of the vehicle in the scenario, wherein the experimental parameter comprises a value controlling an operation of the component during the operation of the vehicle in the scenario;
simulating the scenario by simulating operation of the vehicle based at least in part on using the experimental parameter when operating the component of the vehicle;
determining, based at least in part on simulating the scenario, a simulated collision;
determining simulation data describing the simulated collision between the vehicle and the object in the simulated environment by at least:
determining a mass of the object;
determining a velocity of the object;
determining a velocity of the vehicle;
determining a mass of the vehicle;
determining at least one of an occupant position or a pedestrian position;
determining a collision type of the simulated collision; and
determining a coefficient of restitution for the simulated collision based on the mass of the object, the velocity of the object, the mass of the vehicle, and the velocity of the vehicle;
determining, based at least in part on the simulation data, an initial severity score for the simulated collision;
determining an updated severity score, based at least in part on scaling the initial severity score by a scalar associated with a risk profile determined based at least in part on the collision type, wherein the risk profile is based at least in part on a logistic function describing a probability of injury;
determining an aggregated severity score based on the simulation data and the updated severity score, the aggregated severity score associated with the collision type; and
adjusting a configuration of the component of the vehicle based at least in part on the aggregated severity score exceeding a threshold.

17. The non transitory computer readable medium of claim 16, wherein determining the simulation data comprises receiving log data comprising a detection of the object in a real environment and a movement of the object in the real environment.

18. The non transitory computer readable medium of claim 17, wherein the detection of the object is associated with a bounding box, wherein a mass of the object is approximated based at least in part on a size of the bounding box.

19. The non transitory computer readable medium of claim 16, wherein adjusting the configuration of the component of the vehicle comprises:
generating an aggregate of severity score data from a plurality of simulations by at least:
classifying one or more collisions from the simulation data based at least in part on the collision type; and
generating the aggregate of severity score data by determining an average severity score for individual collision types;
identifying a collision scenario based at least in part on the aggregate of severity score data exceeding a second threshold; and
adjusting at least one operational parameter of the component of the vehicle based at least in part on the collision scenario, wherein the at least one operational parameter may be the experimental parameter.

20. The non transitory computer readable medium of claim 19, wherein determining the aggregated severity score comprises determining the average severity score for a plurality of collisions, the plurality of collisions selected based on the individual collision types.

* * * * *